(12) United States Patent
Prongue

(10) Patent No.: US 10,613,516 B2
(45) Date of Patent: Apr. 7, 2020

(54) METHOD OF OPTIMIZATION OF MACHINING PROGRAMS

(71) Applicant: WILLEMIN-MACODEL SA, Delemont (CH)

(72) Inventor: Christophe Prongue, St-Ursanne (CH)

(73) Assignee: WILLEMIN-MACODEL SA, Delémont (CH)

( * ) Notice: Subject to any disclaimer, the term of this patent is extended or adjusted under 35 U.S.C. 154(b) by 0 days.

(21) Appl. No.: 16/092,002

(22) PCT Filed: Apr. 7, 2017

(86) PCT No.: PCT/EP2017/058437
§ 371 (c)(1),
(2) Date: Oct. 8, 2018

(87) PCT Pub. No.: WO2017/174800
PCT Pub. Date: Oct. 12, 2017

(65) Prior Publication Data
US 2019/0086901 A1 Mar. 21, 2019

(30) Foreign Application Priority Data

Apr. 7, 2016 (EP) ..................................... 16164165
Aug. 16, 2016 (EP) ..................................... 16184342

(51) Int. Cl.
*G05B 19/41* (2006.01)
*G05B 19/416* (2006.01)
(Continued)

(52) U.S. Cl.
CPC ........... *G05B 19/41* (2013.01); *G05B 19/416* (2013.01); *B23Q 15/08* (2013.01); *B23Q 15/22* (2013.01); *G05B 2219/34175* (2013.01)

(58) Field of Classification Search
CPC .. G05B 19/41; G05B 19/4103; G05B 19/414; G05B 19/416; G05B 19/4163;
(Continued)

(56) References Cited

U.S. PATENT DOCUMENTS

| 8,478,438 B2 * | 7/2013 | Nishibashi ......... G05B 19/4103 318/567 |
| 2007/0046677 A1 * | 3/2007 | Hong ..................... G05B 19/41 345/442 |

(Continued)

FOREIGN PATENT DOCUMENTS

| EP | 0917033 A2 | 5/1999 |
| EP | 1235126 A1 | 8/2002 |

(Continued)

*Primary Examiner* — Crystal J Barnes-Bullock
(74) *Attorney, Agent, or Firm* — Leydig, Voit & Mayer, Ltd.

(57) ABSTRACT

A method generates a machining program defining a trajectory of a tool for a workpiece having a first portion which can be machined with only linear axes followed by a second portion requiring a machining with linear axes and one or two rotational axes. A base code is generated defining the trajectory with, for the first portion, a first path by which relative movement occurs only along the linear axes followed by, for the second portion, a second path by which relative movement occurs along the linear axes and rotational axes. Before execution, the base code is optimized to modify the previously defined trajectory, including: modifying the first path with a relative movement occurring along the axes before starting on the second path; and reconstructing a profile of a kinematic quantity of one or both of the rotational axes on the first path to eliminate discontinuities on the profile.

14 Claims, 11 Drawing Sheets

(51) Int. Cl.
*B23Q 15/22* (2006.01)
*B23Q 15/08* (2006.01)

(58) Field of Classification Search
CPC ........... G05B 2219/34175; G05B 2219/43057;
G05B 2219/43199; B23Q 15/08; B23Q 15/22
See application file for complete search history.

(56) References Cited

U.S. PATENT DOCUMENTS

| | | | |
|---|---|---|---|
| 2007/0085850 A1* | 4/2007 | Hong | G05B 19/41 345/442 |
| 2007/0091094 A1* | 4/2007 | Hong | G05B 19/41 345/474 |
| 2009/0248203 A1 | 10/2009 | Nakamura et al. | |
| 2014/0025194 A1 | 1/2014 | Koide | |

FOREIGN PATENT DOCUMENTS

| | | |
|---|---|---|
| EP | 2336839 A1 | 6/2011 |
| EP | 2495628 A1 | 9/2012 |

* cited by examiner

# METHOD OF OPTIMIZATION OF MACHINING PROGRAMS

CROSS-REFERENCE TO PRIOR APPLICATIONS

This application is a U.S. National Stage Application under 35 U.S.C. § 371 of International Application No. PCT/EP2017/058437 filed on Apr. 7, 2017, and claims benefit to European Patent Application Nos. EP 16164165.9 filed on Apr. 7, 2016 and EP 16184342.0 filed on Aug. 16, 2016. The International Application was published in French on Oct. 12, 2017 as WO 2017/174800 A1 under PCT Article 21(2).

FIELD

The present invention is concerned with the field of machining. It relates to a method applied in particular to the field of CADM (computer-aided design and manufacture) with the aim of optimizing the machining programs generated by these softwares.

BACKGROUND

The field of "4- or 5-axis" machining combines the various kinematic machine tool configurations which make it possible to orient the workpiece with respect to the tool with 4 or 5 degrees of freedom, respectively. The 4- or 5-axis machines thus make it possible to machine complex, ruled or warped surfaces by interpolation. The kinematic chain is generally formed by 3 linear axes and 1 or 2 rotational axes for a respectively 4- or 5-axis machine. An example of a 5-axis kinematic configuration is represented in FIG. 1. The tool 1 moves along the three linear axes X, Y and Z, with Z perpendicular to the plane X-Y, and the workpiece 2 moves along the two rotational axes B and C respectively aligned with Y and Z.

The trajectory of the tool is described by the combination of the tool center point (TCP) and of the orientation of the rotational axes of the machine. It is this information which makes up the machining program and defines the path of the tool with respect to the workpiece. What is concerned here is a program in RTCP (rotation tool center point) mode, that is to say that each program line (or program block) is composed of the coordinates XYZ of the path of the tool tip in the frame of reference of the workpiece and of one or two angular coordinates depending on whether work is carried out in four or five axes.

The machining programs are generated with the aid of CADM softwares which allow the pooling of elements defining the application to be processed: geometry of the workpiece and of the tool, kinematic configuration of the machine and machining strategy. It is in particular possible to generate and then visualize the path of the tool on the workpiece.

The tool-tip speed is not a constraining parameter for the generation of the machining program by the CADM. It is generally fixed by the cutting parameters linking the tool and the machined material and is therefore not subject to any constraint linked with the kinematic configuration of the machine on which the program is executed. Thus, maintaining a constant tool-tip advance speed implies that the machine is capable of at any time ensuring the workpiece-tool positioning and the speed which are imposed by the program.

In practice, this latter condition is far from always being observed. For example, when large changes of orientation of the tool are programmed on a small portion of the path of the tool, maintaining the tool-tip advance speed implies dynamic performance levels which the machine cannot always provide. The machine is consequently forced to reduce the tool-tip advance speed so as to comply with the path and the orientation which are imposed by the program.

This phenomenon is illustrated in FIGS. 2a and 2b. It will be noted that the going-around of a small radius defined by the vectors Δx' and Δz' on the machined workpiece results in a much greater movement at the axes of the machine, that is to say Δx and Δz. With these movements being carried out at the same time, the speed of the machine axes is thus amplified with respect to the programmed tool-tip speed.

The reason for this amplification is purely geometric. The movement Δx and Δz of the linear axes of the machine results in fact from the superimposition of two movements. The first movement is composed of the trajectory of the tool tip on the component programmed by the CADM and represented in broken line (Δx' and Δz'). The second movement along the axes X and Y results from the rotation of the component necessary for maintaining the tool-workpiece orientation imposed by the program. This second movement is commonly referred to as "follower" movement. The more the component is off-centered with respect to the axes of rotation of the machine, the greater the amplitude of this follower movement. This observation also applies for the machine configuration of type RTTTR composed of a spindle on axis B and a table on axis C or A.

A second problem encountered in this type of configuration lies in the fact that the CADM systems do not make it possible to anticipate in a controlled manner the speed discontinuities experienced by the axes of the machine when they are subjected to the transitions between the regions machined without rotational axis and those machined therewith.

Starting from the preceding example taken up again in FIG. 3, it will be noted that the two regions of the tool path situated upstream and downstream of the radius can be machined in two linear axes (AL) without intervention of the rotational axes (AR). It is in this way that they are processed by the CADM since the latter limits to a maximum the axes involved in each movement. The speed profile of the axis B resulting from this strategy is represented in FIG. 3. It comprises discontinuities at the start and at the end of the radius (see surrounded regions). They are indeed compatible with the movement simulation generated by the CADM but incompatible with the dynamic performance of the axes of the machine. Specifically, a speed jump is manifested by an acceleration jump which can be complied with only on condition that the available driving force for each axis involved is sufficient. In all cases, these acceleration peaks will have the consequence of subjecting the structures of the machine to inertial forces which are large and therefore incompatible with the level of precision required for the finishing operations, for example. There results the formation of undesirable marks on the workpiece.

This problem of the axis speed discontinuities is directly influenced by the problem explained above. Specifically, the higher the speed to be achieved by the rotational axes on account of the amplification resulting from the follower movements, the higher the speed jump necessary to ensure a constant tool-tip advance speed.

The solution which would consist in reducing the tool-tip advance speed in the program is rarely conceivable since it does not prevent the discontinuities in the speed profiles, it deviates from the optimal cutting conditions and it reduces the productivity of the process.

Other solutions proposed in documents EP 2 336 839, EP 1 235 126 and EP 0 917 033 consist in locally smoothing or softening the speed profile of one or more axes taken independently. These are optimization methods which have the object of modifying the trajectory of the tip of the tool on the passage of a geometric discontinuity. This approach brings into play the notion of error tolerance between the previously programmed nominal trajectory and the softened trajectory resulting from the optimization. The error thus generated is plotted on all the axes taken into account for the reconstruction of the softening trajectory. These solutions indeed make it possible to reduce the discontinuities associated with the axes but in no way take into account the relative position of the various linear or rotational axes of the machine with respect to the workpiece to be machined. In addition, discontinuities on the speeds of the rotational axes can appear in regions where there is not a geometric discontinuity. For example, discontinuities on the speeds of the rotational axes can appear at the junction between a planar portion and a curved portion. In this case, the methods disclosed based on the detection of a geometric discontinuity will not provide solutions. Finally, the aforementioned documents disclose methods of optimization of the programmed trajectory which are applied at the numerical control, which greatly limits the margin of flexibility with respect to a method of optimization applied upstream to the machining program as such. These methods which are applied at the numerical control only allow a very local optimization at the level of the discontinuity.

SUMMARY

In an embodiment, the present invention provides a method for generating a machining program defining a trajectory of a tool for a workpiece having a first portion which can be machined with only linear axes followed by a second portion requiring a machining with linear axes and one or two rotational axes. A base code is generated defining the trajectory of the tool with, for the first portion, a first path by which relative movement occurs only along the linear axes followed by, for the second portion, a second path by which relative movement occurs along the linear axes and the one or two rotational axes. Prior to execution of the machining program on a numerical control, the base code is optimized so as to modify the previously defined trajectory, with the aid of the following steps: modifying the first path with a relative movement occurring along the linear axes and the one or two rotational axes before starting on the second path; and reconstructing, by polynomial interpolation, a profile of a kinematic quantity of one or both of the one or two rotational axes on the first path so as to eliminate discontinuities on the profile.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

Figure 1:
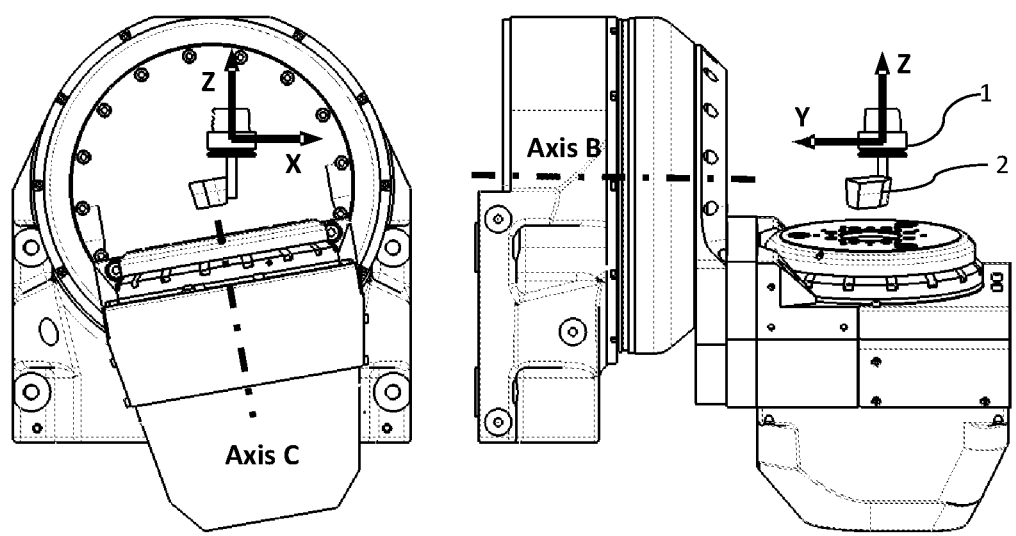
FIG. 1 represents, in a known manner, two views of a 5-axis machining machine with the three linear axes X, Y and Z of movement of the tool and the two rotational axes B and C of the workpiece to be machined (RRTTT type).
Figure 2A:
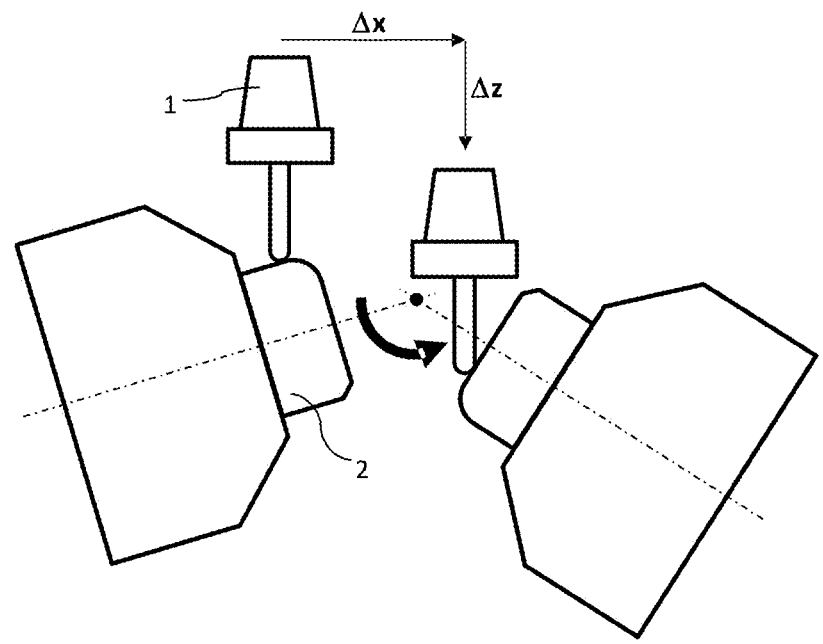
FIGS. 2a) and 2b) represent the movement required along the axes X and Y to ensure the trajectory of the tool tip on the workpiece with compensation in order to maintain the center of the tool in the desired position following the rotation of the workpiece.
Figure 2B:
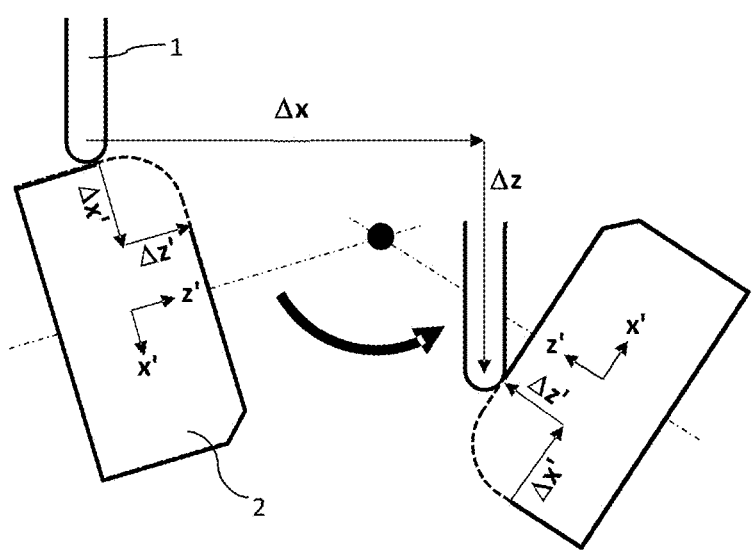
Figure 3:
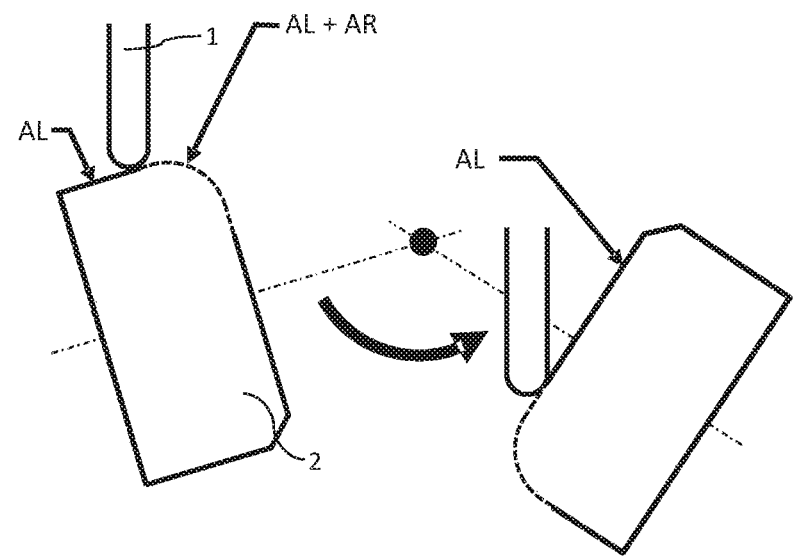
FIG. 3 illustrates with the aid of a graph the speed jump of the rotational axes at the junction between a planar surface machined only with linear axes and a curved surface machined with linear and rotational axes.
Figure 3:
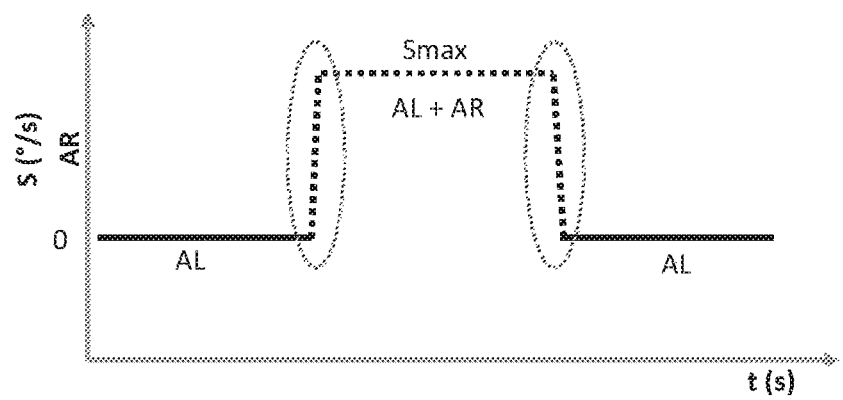

KEY (1) Tool
(2) Workpiece
(3) Ruled surface
(4) Lower edge
(5) Upper edge
(6) Imaginary auxiliary curve serving as support curve
(7) Guide curve
(8) Orientation vector A: Region machined with the linear axes
B: Region machined with the linear axes and at least one rotational axis
AL: Linear axis
AR: Rotational axis In an embodiment, the present invention provides a method of global optimization of the path of the tool which is applied upstream of the numerical control, independently of the latter on which the machining program is executed.

In an embodiment, the present invention provides a method making it possible to optimize the approach trajectories of the regions of high variation of the tool-workpiece orientation, whether they are with or without geometric discontinuities, in order to make the tool-tip speed as constant as possible.

In an embodiment, the present invention provides a method of optimization which is based on a modification of the orientation of the tool with a tool-tip trajectory which, for its part, is not modified.

Embodiments of the present invention ultimately improve the quality of the machined workpieces.

In an embodiment, the present invention provides a method for generating a machining program defining a trajectory of a tool with respect to a workpiece to be machined, said method including:
  the generation of a base code defining the trajectory of the tool with a first path where the relative movement occurs only along linear axes followed by a second path where the relative movement occurs along linear axes and one or two rotational axes,
characterized in that it additionally includes:
  the optimization of the base code in order to modify the previously defined trajectory, with the aid of the following steps:
    modification of the first path with a relative movement occurring along the linear axes and the rotational axis or axes before starting on the second path;
    reconstruction of the profile of a kinematic quantity of said or of one of said rotational axes on the first path in order to eliminate the discontinuities on the profile.

According to particular embodiments of the invention, the method comprises at least one or a suitable combination of the following features:
  the trajectory of the tool comprises an alternation of a plurality of first and second paths;
  the step of modifying the first path is carried out by modifying the alignment and the distribution of orientation vectors of the tool on said first path;
  the step of reconstructing the profile of the kinematic quantity is carried out by polynomial interpolation;
  the step of reconstructing the profile of the kinematic quantity is carried out only on the first path;
  in the presence of two rotational axes, the rotational axis chosen for the step of reconstructing the profile of the kinematic quantity is that having the most unfavorable kinematic configuration. What is meant by the most unfavorable kinematic configuration is that which generates the greatest follower movements within the meaning explained above;
  in the presence of two rotational axes, the kinematic relationship which links the two rotational axes on the first modified path is determined by numerical interpolation;
  in the presence of two rotational axes, the kinematic relationship which links the two rotational axes on the first modified path is determined analytically;
  after the step of reconstructing the profile of the kinematic quantity of one of said rotational axes on the first path, said kinematic relationship is used to reconstruct the profile of a kinematic quantity of the other of said rotational axes;
  the kinematic quantity is speed;
  after the step of reconstructing the profile of the speed of said or of one of said rotational axes on the first path, its position profile is recomposed by integration of the reconstructed speed profile;
  in the presence of two rotational axes, the position profile of the other of said rotational axes is calculated on the basis of the kinematic relationship linking the positions of the two rotational axes;
  it comprises a step of adaptating the base geometry of the workpiece to be machined before the step of optimizating the base code;
  the adaptation step consists in extending the surfaces to be machined of said workpiece, an imaginary curve serving as a support for the tool being created in the extended part of the workpiece.

In another embodiment, the present invention provides a machining program defining a tool trajectory for a workpiece having a first portion which can be machined with only linear axes followed by a second portion requiring a machining with linear axes and one or two rotational axes, characterized in that the tool trajectory comprises for the first portion a path with a machining along the linear axes and the rotational axis or axes, and in that the speed profile of said or of one of said rotational axes is continuous between the first portion and the second portion.

In a further embodiment, the present invention provides means of recording data readable by a computer comprising the program described above.

The various parameters describing the tool path and their specific influence have been described above. Some of them such as the geometry of the workpiece and the kinematics of the machine are fixed for each application on a given machine. Only the machining strategy and, to a lesser extent, the geometry of the tool are open parameters which make it possible to have an influence on the final quality of the tool-workpiece trajectory.

Consequently, an embodiment of the present invention provides method for generating a machining program aimed at optimizing the approach trajectories of the regions of high variation of the tool-workpiece orientation so as to anticipate the discontinuities in the speed and acceleration profiles. This thus makes it possible to make the movements of axes of the machine compatible not only with the performance of said axes but also to maintain the tool-tip speed as constant and homogeneous as possible.

This method applies to the cases of 4- and 5-axis machining for any type of surface and, more particularly, for ruled or warped surfaces. All the serial or parallel machine kinematics comprising 3 linear axes and one or more rotational axes are capable of benefiting from the present invention. It thus applies equally well to the configurations with the 3 linear axes on the tool and the rotational axis or axes on the workpiece (RRTTT) as to other configurations with, for example, the linear axes conditioning the movement of the workpiece (RTTTR).

The method revolves around two steps.

So as to anticipate the discontinuities in the speed and acceleration profiles, one step consists in setting in movement the rotational axis or axes before the region of high variation of the tool-workpiece orientation. In other words, this step consists in combining linear and rotational movements of the axes in the regions of the workpiece where the machining could take place by interpolation of the linear axes only. For example, that occurs by modifying the alignment and the distribution of the orientation vectors of the tool in the base code of the machining program. This approach is applied whether the surface is ruled or warped, with the sole difference that, in the case of a warped surface, the orientation vectors are not necessarily parallel to the surface in question. This approach makes it possible to improve the global behavior at the tool tip. However, as described later, this step makes it possible to reduce the amplitude of the discontinuity but does not nullify it.

Consequently, the method according to an embodiment comprises another essential step of optimizing the tool trajectory upstream and downstream of the discontinuity and, more precisely, upstream and downstream of the region of high variation of the tool-workpiece orientation. In this step, the speed profile of one of the rotational axes or of the single rotational axis in the case of a 4-axis machining is recomposed upstream and downstream of said region in order to eliminate the discontinuity. The optimization can be carried out on the speed profile or on other kinematic quantities, such as acceleration, for example. The reconstructed profile results from the juxtaposition of one or more polynomial curves. The choice of the rotational axis to be optimized is based on the rotational axis which has the most unfavorable kinematic configuration. Thus, the rotational axis is chosen on the basis of criteria such as its influence on the follower movements.

In the case of a 5-axis machining, the method additionally comprises a step of synchronization between the two rotational axes on the basis of the kinematic relationships which link said axes to the geometry of the workpiece and to its interaction with the tool. In other words, what is concerned is a step of reconstructing the profile of a kinematic quantity of the second rotational axis based on the optimization of the first rotational axis and the kinematic relationship which links these two axes.

The method can optionally comprise other steps which are a function of the geometry to be machined and constraints imposed by the machining machine. These steps will be described below in an example illustrating the machining of a ruled surface with the aid of a 5-axis machine.

It will be specified that, in the examples illustrated, the discontinuities in the speed profile appear more particularly at the junction between a planar portion and a curved portion. However, speed jumps can, as a function of the workpiece to be machined, appear at other points. It goes without saying that the method maintains its relevance in these scenarios.

It will be specified again that, by virtue of the relationship which links the position of the TCP with time, the optimization described here covers not only this position but also all the quantities which result from its (single or multiple) derivation with respect to time. The method according to the invention makes it possible to optimize the variations of the orientation of the tool with respect to the workpiece while keeping the previously defined tool-tip nominal trajectory in the base code.

The program equally makes reference to the ISO programming language as to the various programming languages developed by the machine tool manufacturers.

The processes of removing material in 4 or 5 axes potentially concerned by this method are milling, laser cutting, planing or else machining with ultrasonic assistance. This list is not exhaustive.

The method according to an embodiment of the invention is illustrated below for machining, with the aid of a 5-axis machine, a ruled surface as presented in FIG. 4. Certain constraints at the machining level have intentionally been added to illustrate an optional step of preparing the geometry of the workpiece to be machined.

The method thus comprises:
a step of preparing the geometry;
a step of adapting the speed profile of the rotational axes which consists in setting in movement the rotational axis or axes before the region of high variation of the tool-workpiece orientation, that is to say in the portion which could be only machined with the aid of the linear axes;
a step of optimizing the speed profile of one of the rotational axes which consists, inter alia, in recomposing a suitable speed profile upstream and downstream of said region such that the profile upstream and the profile downstream are continuous.

Optional Step of Preparing the Geometry

For a workpiece or a given contour on a workpiece, it may be necessary to make certain preparatory adaptations before subjecting them to the CADM software. This preparation is based on the principle that the tool tip (TCP) must absolutely follow the most constraining geometric line. This line can be an edge or a generatrix. It will be chosen as a function of the functional, dimensional and/or esthetic constraints of the region in question. The justification of this first principle is explained by the fact that, in 5-axis machining, the tool trajectory is described by the combination of the position of the TCP (coordinates X, Y and Z) and the orientation of the rotational axes. It is this information which makes up the program and which fixes the position and the orientation of the tool with respect to the workpiece. By virtue of the geometric configuration of a conventional machine (3 linear axes in series plus 2 rotational axes in series), the information which is reproduced in the most reliable manner is the position of the TCP in the workpiece frame of reference. The orientation of the rotational axes is more difficult to control, in particular on account of the relative offsets which, if they are poorly defined, generate positioning errors on the follower movements. The following example illustrates this first principle and shows how the model must be adapted such that it remains exploitable by the CADM. In FIG. 4, the ruled surface 3 situated between the lower edge 4 and the upper edge 5 can be machined in 4 axes, but it has been chosen to process the machining in 5 axes, which is the most constraining solution.

Various strategies can be implemented to machine this surface. There can be mentioned in particular:
machining "between two geometries" which consists in choosing an edge as location of the points followed by the tool tip (guide curve) and the second edge as support curve.
machining of a "surface" which takes account of the surface itself for calculating the position of the tool.

The first strategy, which is that which offers the greatest implementation flexibility, has been chosen. While now acknowledging that the application under study imposes the following constraints:
the predominant geometric line is the upper edge 5;
the fastening of the workpiece to the machine does not make it possible to choose the lower edge 4 as support curve;
a problem is encountered which cannot be dealt with simply by the CADM.

Figure 5:
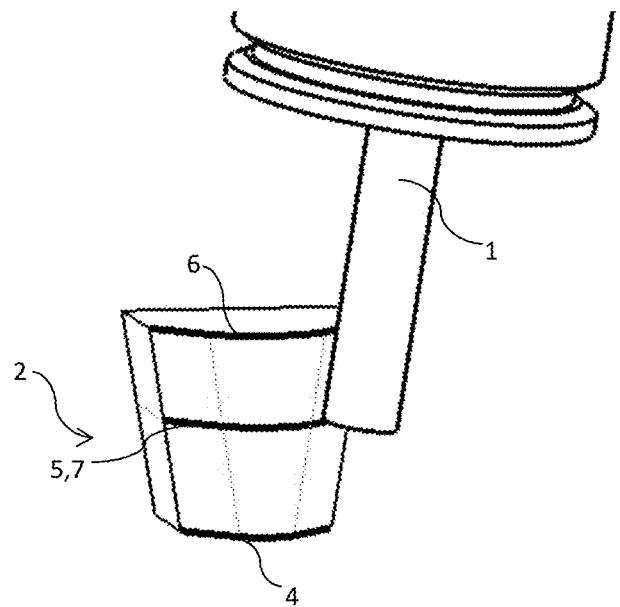
FIG. 5 represents the workpiece of FIG. 4 after adaptation of the geometry for the requirements of the programming of the machining according to the invention.

According to an embodiment of the invention, it is provided to get around the problem by constructing an imaginary auxiliary curve 6 which will serve as a support curve for the tool 1. This curve is obtained by an extrusion of the workpiece as represented in FIG. 5, which guarantees that the orientation of the surface to be machined will be maintained. It is important that the base geometry is defined in the purest and most faithful manner possible. This will avoid any discontinuities of trajectory that are detrimental to the fluidity of the movement.

It is observed in FIG. 5 that, as it stands, it is still necessary to adapt the tool length in such a way that the face to be machined is well covered by the tool. This adaptation can be carried out on the CADM or by adapting the parameters of the tool in the numerical control.

Step of adapting the speed profiles of the rotational axes

Figure 4:
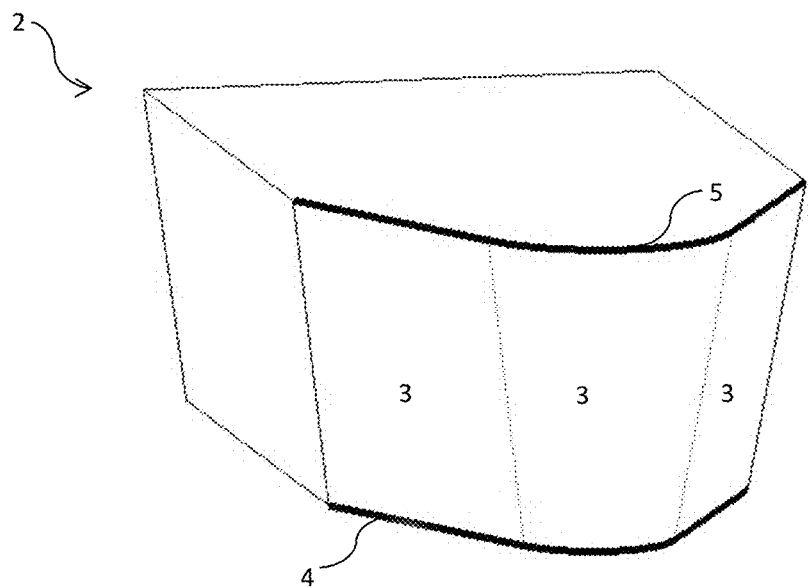
FIG. 4 represents an example of a ruled surface capable of being machined on the basis of the program generated by the method according to the invention.
Figure 6:
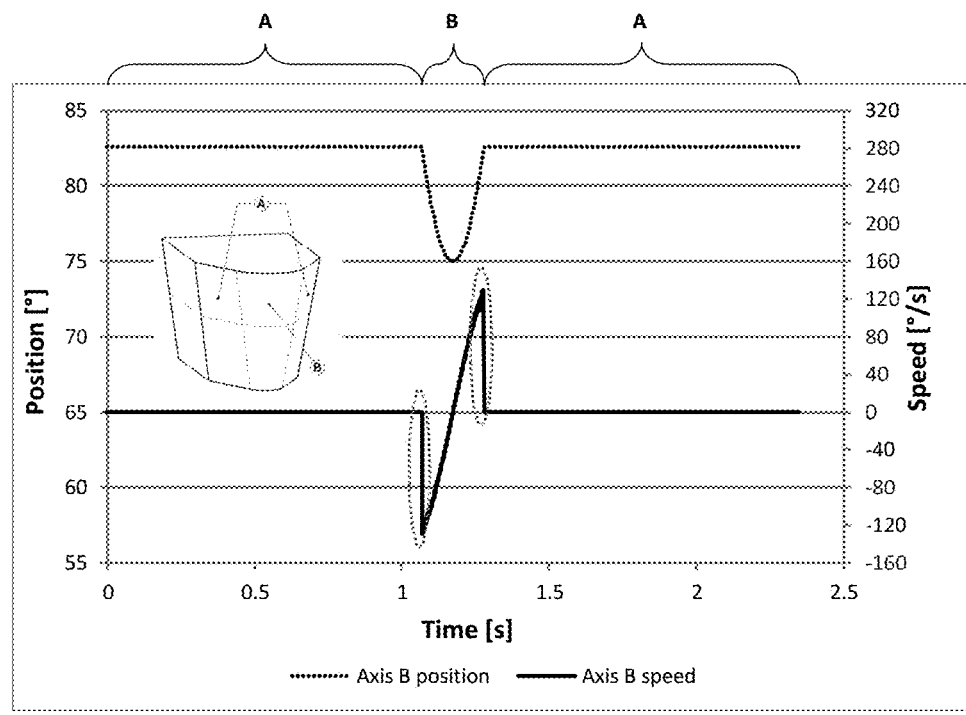
FIGS. 6 and 7 graphically represent the position and the speed of the respective rotational axes as a function of time. In a conventional manner, the surfaces are machined in 3 axes for the parts A of the workpiece, and in 5 axes for the part B.
Figure 7:
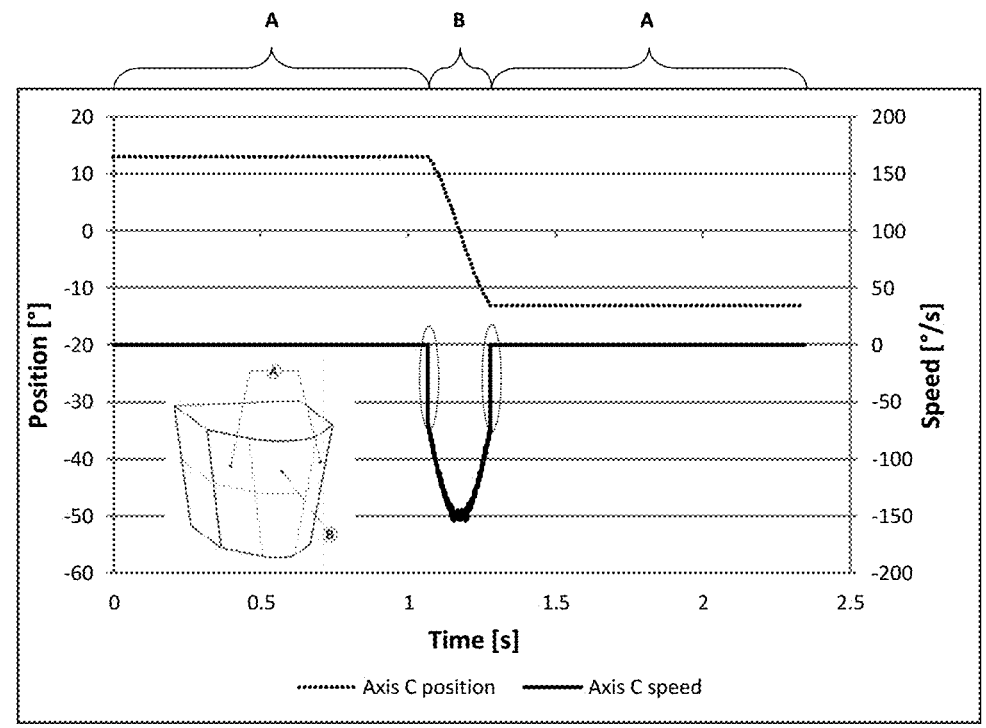

The workpiece illustrated in FIG. 4 contains a ruled surface 3 which must in part be machined in 5 axes. This surface contains a succession of planar portions A and curves B represented in FIG. 6. The approach commonly used in this kind of configuration is to machine the planar portions in 3 axes and the curved portions in 5 axes. This manner of acting poses a problem for the connection of these various regions: as already mentioned, the tool-tip advance speed cannot be maintained given that the linear axes must slow down to remain synchronized with the rotational axes in the acceleration phase. Thus, during this phase, the structure of the machine is subjected to high inertial forces which adversely affect the final precision of the workpiece-tool positioning and are manifested by marks on the workpieces. FIGS. 6 and 7 illustrate the speed jumps of the rotational axes at the origin of these phenomena (see surrounded junctions).

In order to avoid the acceleration peaks at the surface junctions and thus tackle the problematic machining regions in a gentler manner, it is proposed to manage the acceleration and the deceleration of the rotational axes with controlled speed profiles along the lateral planar surfaces. More precisely, it is proposed to force the machining in 5 axes for the planar portions. This constraint can be applied only under certain conditions which are specific to each geometry and listed below by way of the example.

Figure 8:
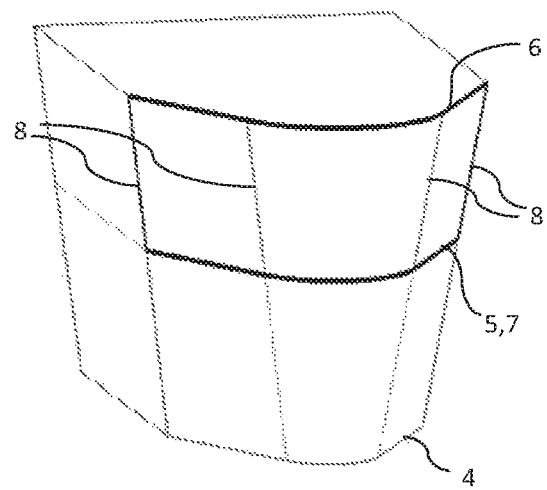
FIG. 8 represents the curves used for the programming of the machining of the workpiece after adaptation of the geometry according to the invention.
Figure 9:
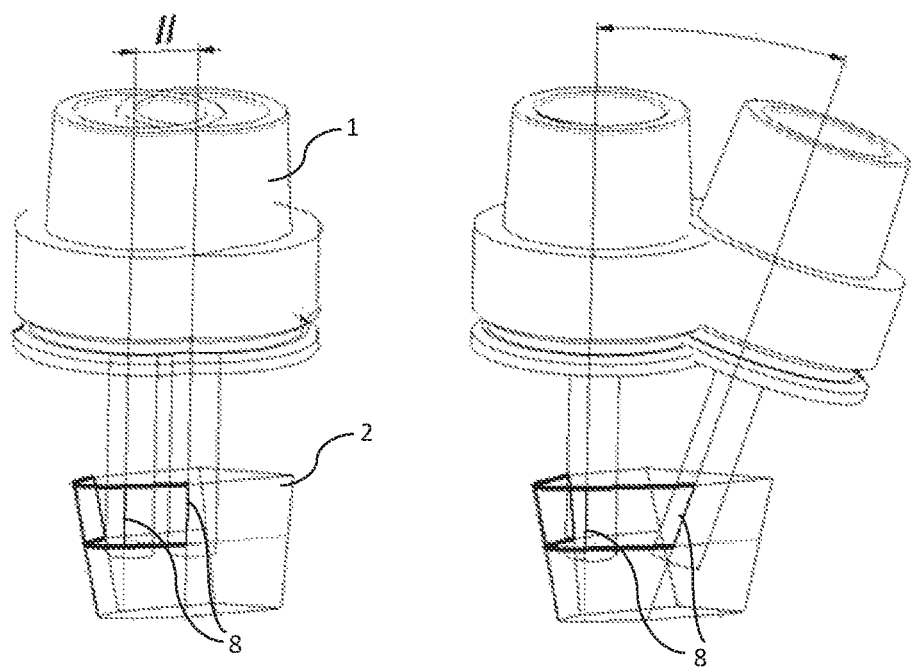
FIG. 9 illustrates the influence of the misalignment of the orientation vectors on the position of the tool in the planar regions.

In FIG. 8, the base geometric elements which serve for the programming of the tool path are represented. In addition to the support curve 6 and the guide curve 7, orientation vectors 8 are distributed along the tool path and fix the orientation of the tool at a given point. It is observed that the two vectors 8 which delimit the planar surfaces are parallel, which means that the orientation of the tool remains identical between the start and the end of the path associated with these surfaces. The trajectory of the tool therefore remains defined with the 3 linear axes. By contrast, when the starting vector assumes a slight inclination while remaining in the plane of the surface, the orientation of the tool is different between the start and the end of this surface, which is manifested by a tool path combining the linear and rotational axes. FIG. 9 illustrates this difference. This approach thus makes it possible to set the rotational axes in movement before tackling the transition between the various machined regions. However, a problem of size remains: the CADM systems do not make it possible to modulate this speed as a function of the position of the tool between the two orientation vectors. Thus, the angular speed remains constant along the whole length of this portion, which reduces the amplitude of the speed discontinuity but does not nullify it.

Figure 10:
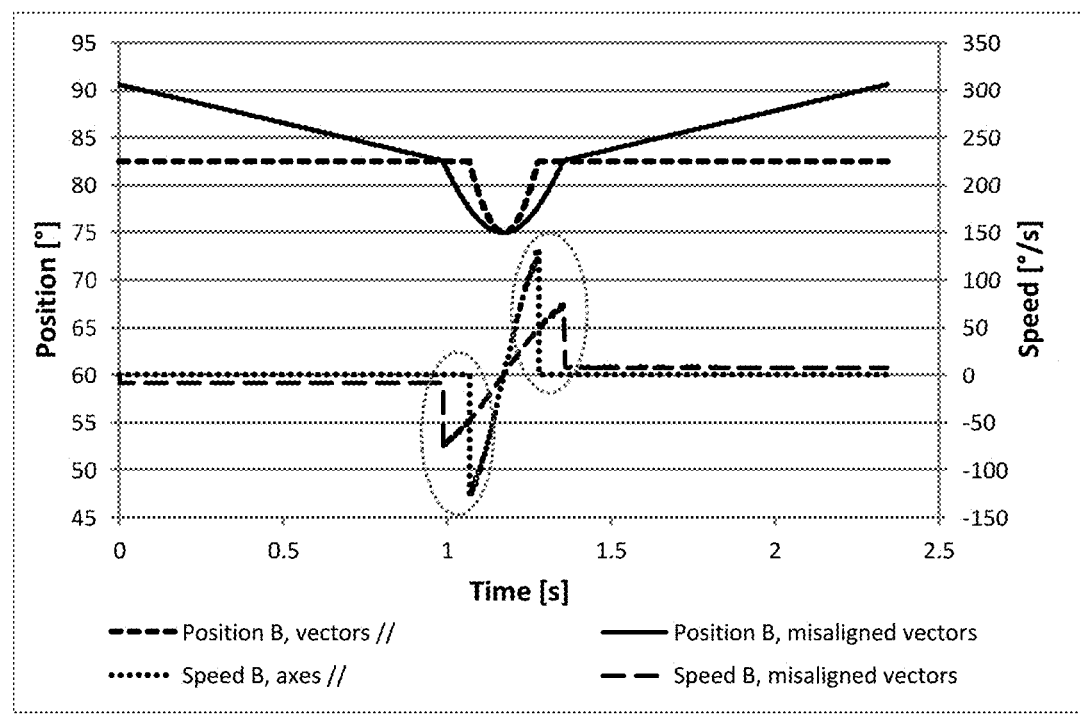
FIGS. 10 and 11 graphically illustrate the influence of the misalignment of the orientation vectors on the position and the speed of the respective rotational axes as a function of time.
Figure 11:
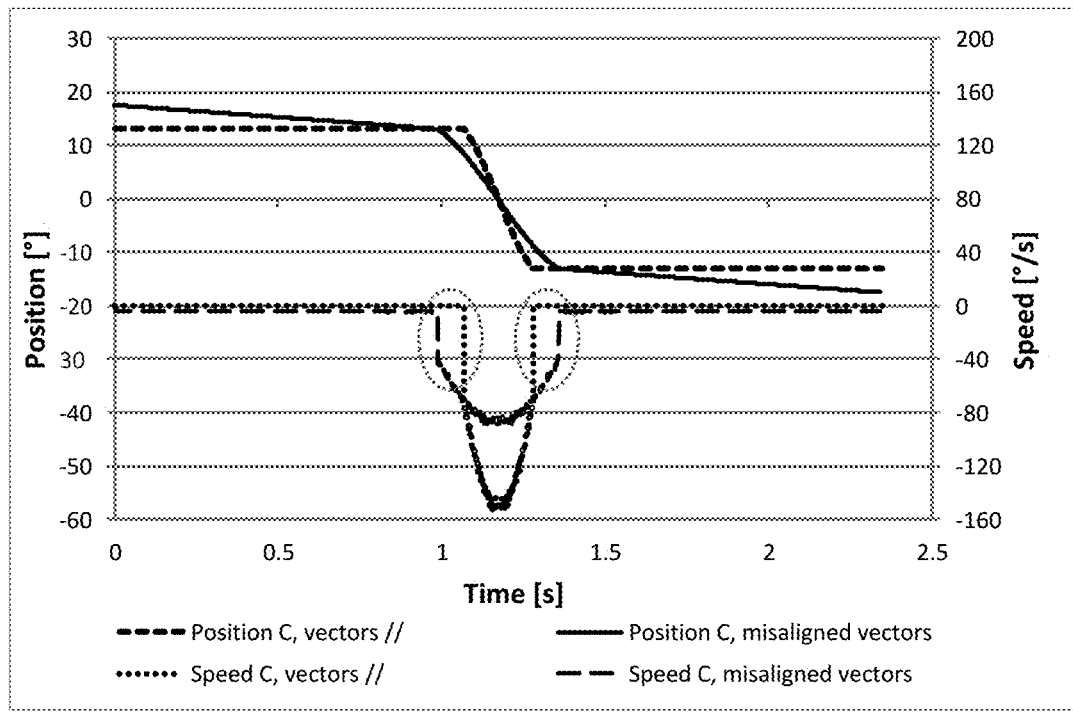

At this stage, in spite of the adaptations made on the geometric entities, it can be seen in FIGS. 10 and 11 that the CADM systems do not make it possible to avoid these discontinuities in the speed profile. Nevertheless, this approach makes it possible to give very useful information on the kinematic relationship which links the position of the axis B and that of the axis C in the two planar lateral portions of the workpiece. The exploitation of this information will be dealt with in the following step of optimizating the speed profiles. Another approach consists in analytically determining the kinematic relationship which links the rotational axes B and C. The geometry of the workpiece defined in the CAD file associated with a given tool geometry makes it possible to define, at each point of the trajectory of the tool center, the combinations of the rotational axes which ensure a correct workpiece-tool orientation, the aim being to ensure a chain of these combinations which is optimal in terms of continuity of the speed profiles of the rotational axes. This approach makes it possible to know the relationship B-C at all points (XYZ) of the tool trajectory without passing through the aforementioned step of modifying the alignment of the orientation vectors of the tool.

Step of Optimizing the Speed Profiles of the Rotational Axes:

The final step of the method according to the invention consists in optimizing the speed profiles of the rotational axes obtained in the preceding step such that they remain continuous in the transition regions.

In a first instance, it is necessary to choose the reference rotational axis. This choice is made on the basis of the following consideration: the reference rotational axis is that which has the most unfavorable kinematic configuration. Thus, its optimization will be the most influential on the attenuation of the unwanted inertia forces which adversely affect the relative workpiece-tool position during the machining. In the example treated, the axis B is chosen as reference axis given that the workpiece can rarely be positioned at the center of this axis. The offsets, which are sometimes large, are at the origin of follower movements whose dynamics adversely affect the precision of the relative workpiece-tool position. This rule is not absolute and can vary from case to case.

Figure 12:
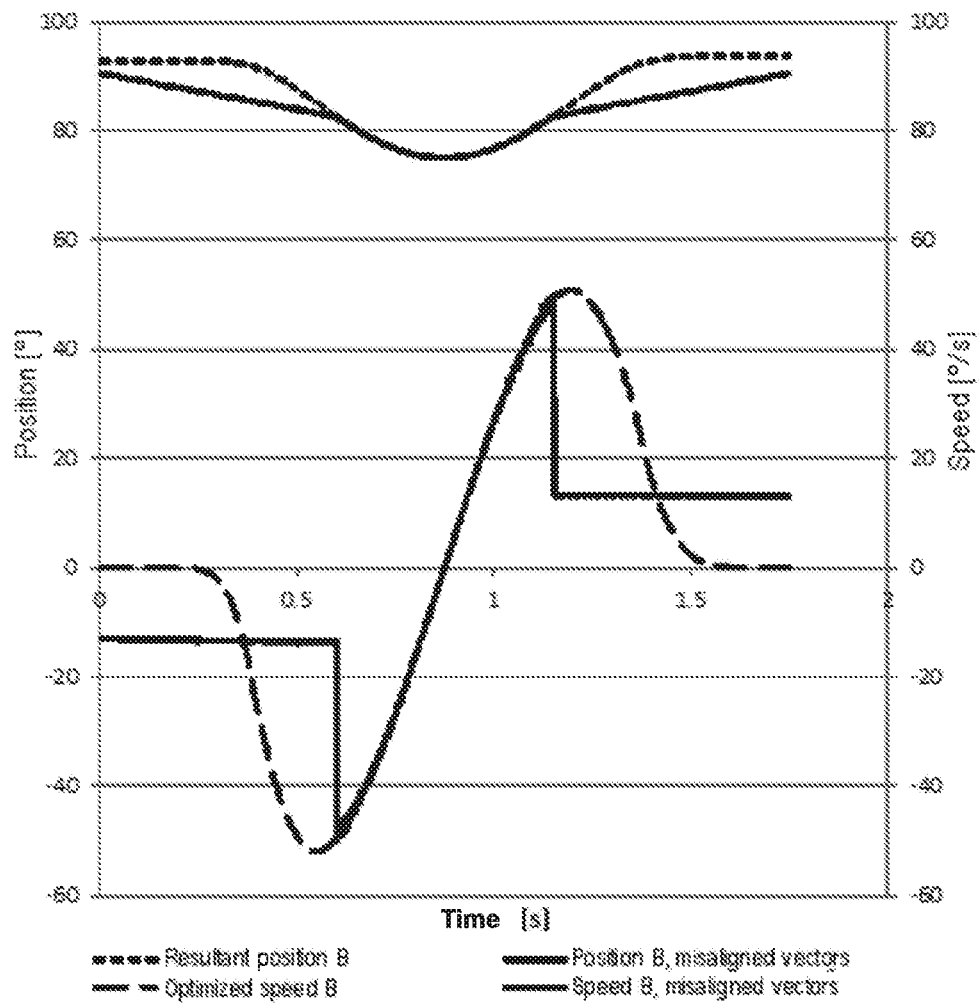
FIG. 12 graphically represents the position and the speed of a rotational axis as a function of time before and after optimization according to the invention.

Next, the speed profile of the axis B is optimized. The optimization of the speed profile is based on the necessity of avoiding jumps or discontinuities. The idea is to recompose a suitable speed profile upstream and downstream of the transition regions. The choice of working on these upstream/downstream regions and not on the central region is explained by the fact that, in the central region, the kinematic relationship which links the positions B and C is bijective. In other words, for a point of the guide curve situated on the curved surface, a single combination BC makes it possible to determine the orientation of the tool. By contrast, a plurality of combinations BC are possible for a point situated on the lateral planar faces. It is this flexibility which makes it possible to recompose a more suitable speed profile while observing the geometric constraints of the workpiece. FIG. 12 illustrates this approach. The speed profile resulting from the CADM is represented in continuous line and a profile composed so as to avoid the discontinuities is represented in broken line. Such a profile results from the juxtaposition of one or more discretized polynominal curves of the form:

$$\frac{B_i - B_{i-1}}{t_i - t_{i-1}} = \sum_{j=0}^{n} a_j \cdot t_i^j$$

Figure 13:
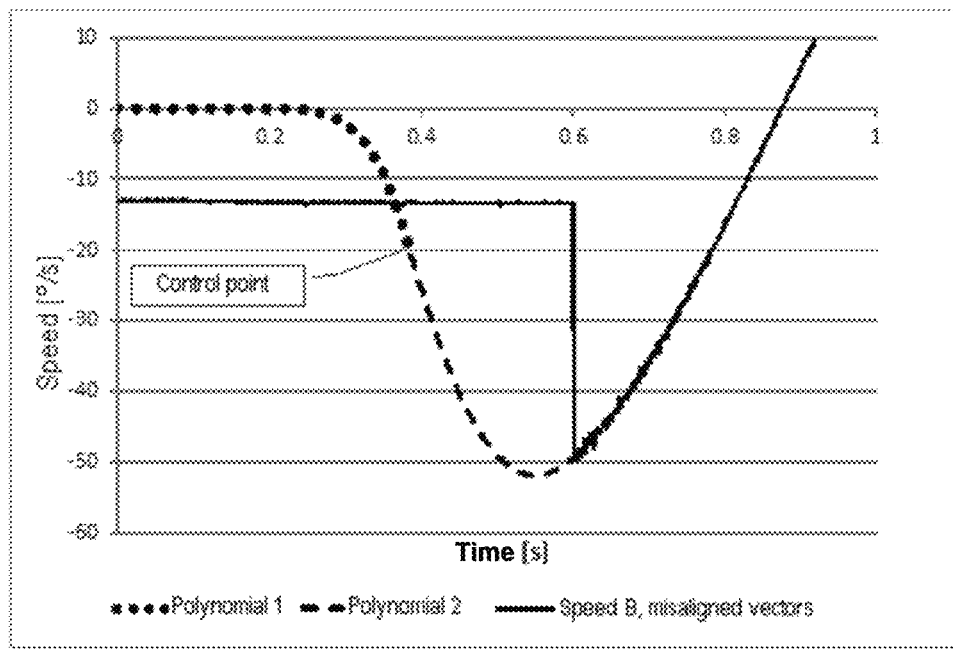
FIG. 13 is an enlargement of a part of the graph of FIG. 12 where there can be seen the point of connection between the two interpolation polynomials.

The data generated by the CADM are defined in a discrete manner by the "blocks" which make up the program. The time base is obtained by division of the length of each segment (defined by 2 consecutive blocks) making up the guide curve by the advance speed of the TCP. These polynomials are thus calculated by polynomial interpolation. A control point and also the choice of the degree n of each polynomial make it possible to ensure an optimal continuity of the speed profile between the two curves and also at the connection with the original profile (FIG. 13). The same approach is applied to the planar face emanating from the curved part.

Once the speed profile has been optimized, the position profile of the axis B is reconstructed by numerically integrating the speed values in a backward manner starting from the transition point. An example of reconstruction is presented in FIG. 12.

Next, the corresponding position of the axis C is calculated. The reconstruction of the position of the axis C is constrained by the kinematic relationship which links it with the position of the axis B. As a reminder, even though there are a plurality of possible combinations BC for a given point on the planar face, each of these combinations is constrained by the orientation of this same face. The advantage here is that, by virtue of the adaptation of the geometric base elements that is described above, it is possible to determine the relationship which links the relative positions of the rotational axes in order that the face remains planar.

Figure 14:
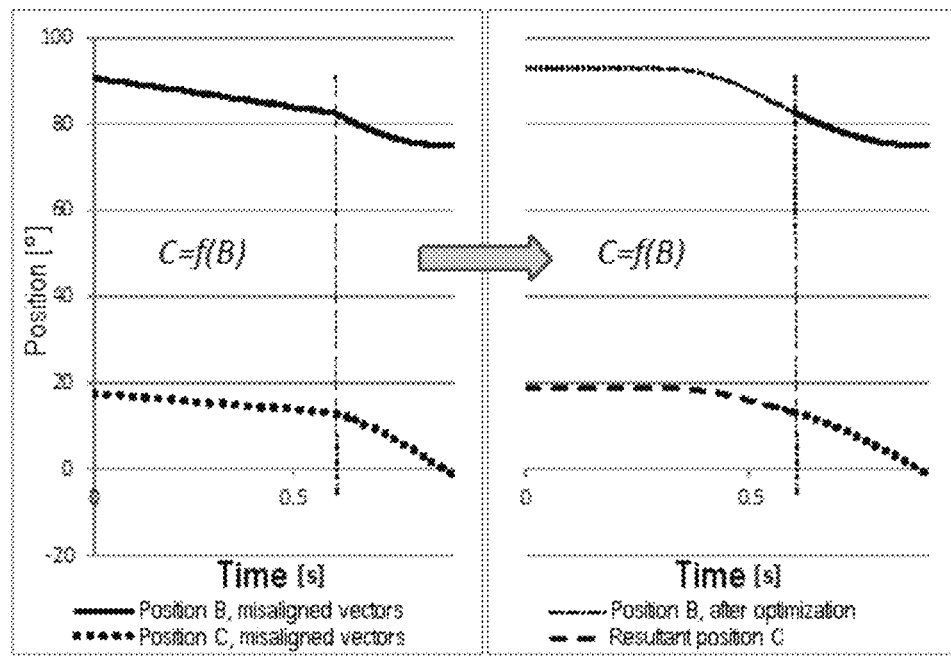
FIG. 14 represents on the left the function which kinematically links the position of the axis B to the position of the axis C after misalignment of the orientation vectors in the planar regions. On the right, it represents this same function applied to the position of the axis B after optimization in order to determine the resultant position of the axis C.

Starting from the values of the program calculated in "misaligned orientation vectors" configuration, it will be noted that, for each of the lateral planar faces, it is possible to define, by numerical interpolation, a relationship of the type C=f(B) (FIG. 14). To better understand this relationship, it can be defined as being the condition which ensures that the axis of the tool is always parallel to the lateral plane in question. As the geometry is not impacted by the optimization of the axis B, the same function can be applied to the optimized position profile of the axis B to obtain the corresponding axis C position. The corresponding speed profiles are illustrated in FIG. 15.

As already mentioned, the determination of the kinematic relationship B-C can be avoided by numerical interpolation by directly determining said relationship analytically.

Figure 15:
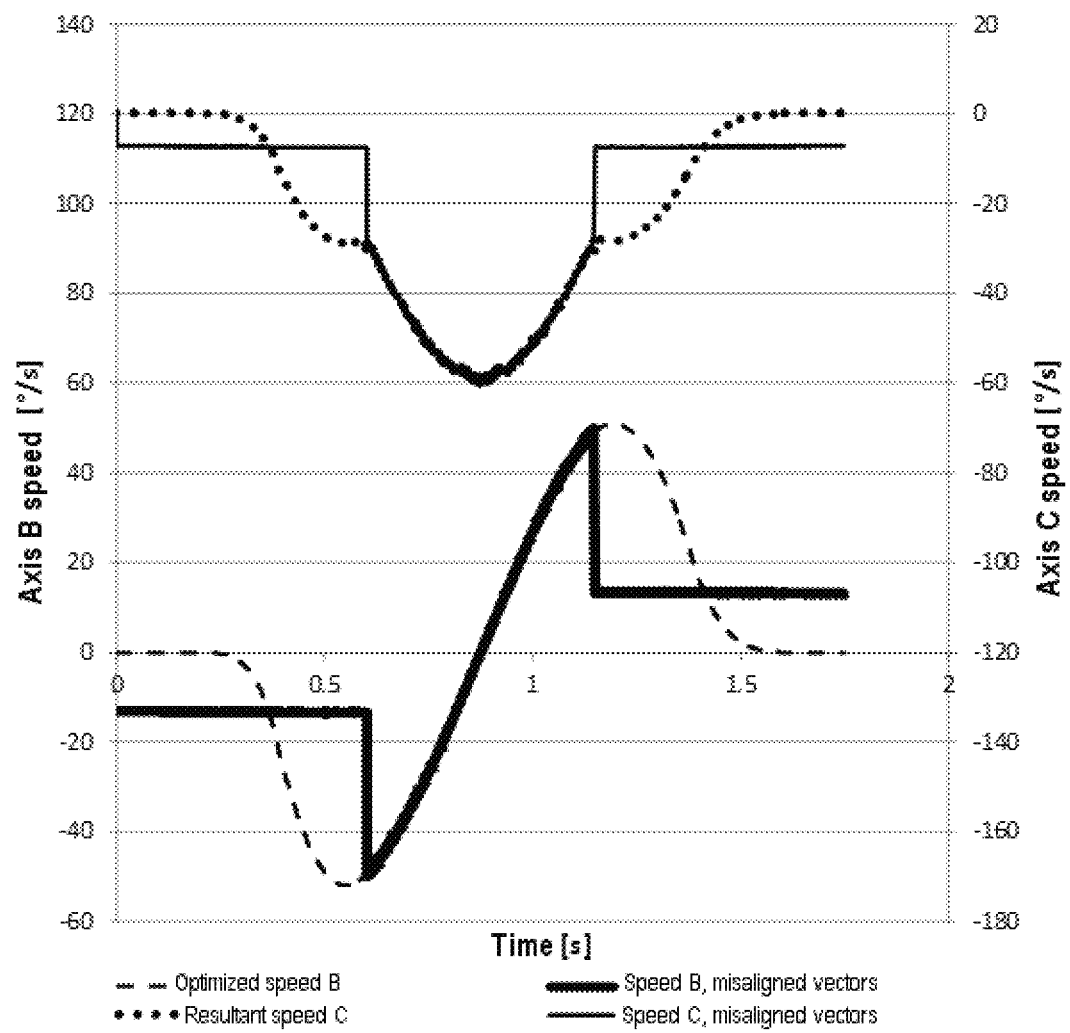
FIG. 15 graphically represents the speed of the rotational axis B as a function of time before and after optimization according to the invention and the speed of the rotational axis C which results therefrom.

It is observed in FIG. 15 that the fact of having optimized one of the rotational axes does not necessarily ensure that the second axis is perfectly optimized. Consequently, it is necessary to choose a preferential rotational axis as explained above. It will be noted in FIG. 15 that the speed profile of the resultant axis C is no longer discontinuous but it still has high variations of slope at the transition points.

Figure 16:
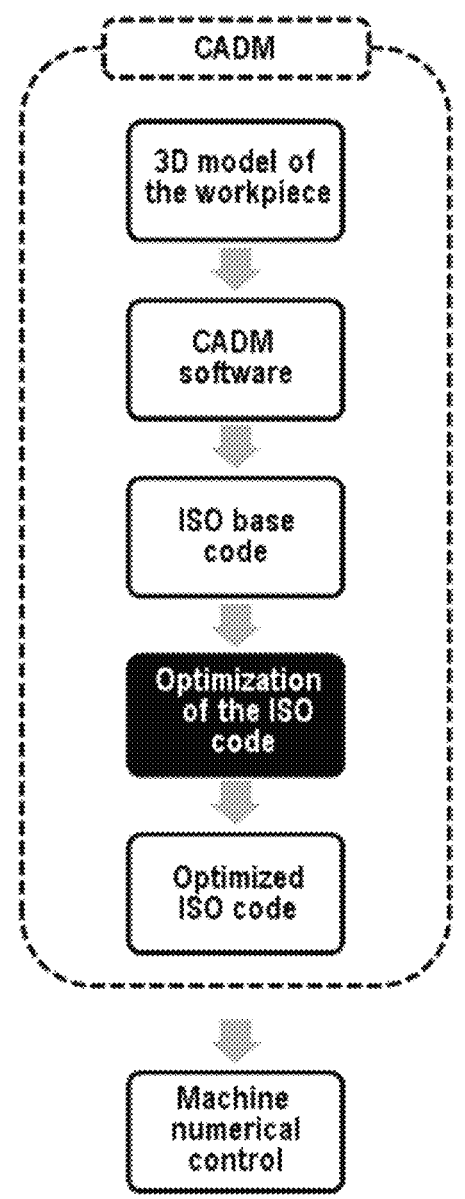
FIG. 16 represents with the aid of a block diagram the steps implemented in the method of generating a machining program according to the invention, followed by the step of executing the generated program at the numerical control equipping the machining machine.

In summary, FIG. 16 illustrates, with the aid of a block diagram, the optimization method implemented at the CADM level followed by the execution on the numerical control of the optimized machining program.

By contrast with the current ISO code which generates tool paths based mainly on the dimensional observance of the geometry of the workpiece to be machined, the machining program modified according to the method according to the present invention also takes account of the actual performance of the machine tasked with ensuring a correct relative positioning between the workpiece and the tool.

The method is entirely independent of the numerical control on which the program is executed. This makes it possible to introduce greater and more global modifications on the previously defined trajectory while taking account of the kinematic relationships which link the axes. This thus makes it possible to adapt the method to the kinematics of the machine under study independently of the NC with which it is equipped. Thus, the machining program sent to the NC is already optimized and requires no additional processing functionality.

The engagement in the regions of high trajectory variation occurs in a coordinated manner between a plurality of axes of the machine. The combination of the linear and rotational movements of the axes in regions of the workpiece where the machining could take place by interpolation of the linear axes only makes it possible to improve the overall behavior at the tool tip.

Unlike in the prior art, the optimization according to the invention is based only on the rotational axes and is aimed at improving the changes of orientation between the workpiece and the tool with a tool-tip trajectory (coordinates XYZ) which is not modified.

According to an embodiment of the invention, the anticipation of the rotational movements is applied to a wide portion of the trajectory in question by contrast with the solutions of the prior art which are applied in a very localized manner around the geometric discontinuities. This results in a simplified interpolation with one and the same polynomial curve for a multitude of points integrating a large quantity of blocks preceding the critical region contrary to the methods of the prior art requiring a different interpolation between each consecutive block so as to remain in the positioning error tolerance band.

The method according to an embodiment of the invention makes it possible to generate a machining program defining a tool trajectory with a constant tool-tip speed.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for generating a machining program defining a trajectory of a tool for a workpiece having a first portion which can be machined with only linear axes followed by a second portion requiring a machining with linear axes and one or two rotational axes, said method comprising:

generating a base code defining the trajectory of the tool with, for the first portion, a first path by which relative movement occurs only along the linear axes followed by, for the second portion, a second path by which relative movement occurs along the linear axes and the one or two rotational axes; and prior to execution of the machining program on a numerical control, optimizing the base code so as to modify the previously defined trajectory, with the aid of the following steps:

modifying the first path with a relative movement occurring along the linear axes and the one or two rotational axes before starting on the second path; and reconstructing, by polynomial interpolation, a profile of a kinematic quantity of one or both of the one or two rotational axes on the first path so as to eliminate discontinuities on the profile.

2. The method as claimed in claim 1, wherein there are two rotational axes, the method further comprising, after the step of reconstructing the profile of one of the two rotational axes, synchronizing between the two rotational axes based on a kinematic relationship which links the two axes.

3. The method as claimed in claim 2, wherein the kinematic relationship which links the two rotational axes on the first modified path is determined by numerical interpolation or analytically.

4. The method as claimed in claim 1, wherein the step of modifying the first path is carried out by modifying an alignment and a distribution of orientation vectors of the tool on the first path.

5. The method as claimed in claim 1, wherein there are two rotational axes, and wherein one of the two rotational axes which generates greater follower movements is chosen for the step of reconstructing the profile of the kinematic quantity.

6. The method as claimed in claim 1, wherein the kinematic quantity is speed.

7. The method as claimed in claim 6, the method further comprising, after the step of reconstructing the profile of the speed, a position profile of one of the two rotational axes is recomposed by integration of the reconstructed speed profile.

8. The method as claimed in claim 7, wherein there are two rotational axes, and wherein the position profile of the other one of the two rotational axes is calculated on the basis of a kinematic relationship linking the positions of the two rotational axes.

9. The method as claimed in claim 1, wherein the tool comprises a tip and the step of optimizing the base code does not modify a trajectory of the tip.

10. The method as claimed in claim 1, further comprising a step of adapting a base geometry of the workpiece to be machined before the step of optimizing the base code.

11. The method as claimed in claim 10, wherein the step of adapting the base geometry of the workpiece is performed by extending surfaces of the workpiece to be machined and creating an imaginary curve serving as a support for the tool in the extended surfaces of the workpiece.

12. A non-transitory computer-readable medium comprising a machining program intended, after optimization, to be executed on a numerical control, the machining program being adapted for a workpiece having a first portion which can be machined with only linear axes followed by a second portion requiring a machining with linear axes and one or two rotational axes, the machining program being optimized so as to define a tool trajectory comprising, for the first portion and for the second portion, a path with a machining along the linear axes and the one or two rotational axes, such that a profile of a kinematic quantity of one or both of the one or two rotational axes being continuous between the first portion and the second portion.

13. A non-transitory computer-readable medium comprising a computer program intended to be executed on a numerical control, the computer program adapted to optimize base code so as to modify a previously defined trajectory of a tool for a workpiece by:

modifying a first path of the trajectory with a relative movement occurring along linear axes and one or two rotational axes before starting on a second path of the trajectory; and reconstructing, by polynomial interpolation, a profile of a kinematic quantity of one or both of the one or two rotational axes on the first path so as to eliminate discontinuities on the profile.

14. The computer-readable medium as claimed in claim 13, wherein the computer program is adapted to optimize the base code without modifying a trajectory of a tip of the tool.

* * * * *